United States Patent [19]

Gray

[11] 4,013,241
[45] Mar. 22, 1977

[54] MAGNETIC BRAKING AND CLUTCH SYSTEM

[76] Inventor: Robert C. Gray, 280 Clifford St., Blackfoot, Idaho 83221

[22] Filed: Mar. 6, 1975

[21] Appl. No.: 556,083

[52] U.S. Cl. .................. 242/84.52 B; 192/84 PM; 310/93
[51] Int. Cl.² ...................................... A01K 89/02
[58] Field of Search ............ 242/84.52 B, 84.52 A, 242/84.52 R, 84.5 R, 99; 310/93; 188/267, 158, 161, 164; 192/53 D, 84 PM, 18 B

[56] References Cited
UNITED STATES PATENTS

| | | | |
|---|---|---|---|
| 854,996 | 5/1907 | Garland | 310/93 X |
| 2,366,562 | 1/1945 | Schug | 310/93 X |
| 2,482,428 | 9/1949 | Miller | 242/84.52 B |
| 2,598,846 | 6/1952 | Smith et al. | 242/84.5 R |
| 2,962,144 | 11/1960 | Heinemann et al. | 192/84 PM |
| 3,579,003 | 5/1971 | Gray | 310/93 |
| 3,712,426 | 1/1973 | Gilbrech | 188/164 |

*Primary Examiner*—Charles A. Ruehl
*Attorney, Agent, or Firm*—Richard F. Bojanowski

[57] ABSTRACT

A magnetic braking and clutch system is disclosed which includes a two piece stator-like housing fixed to an opposing member by means of long stemed bolts passing axially through openings bored along the peripheral edge of the stator-like housing. A plurality of rod-shaped magnets are carried axially within the stator-like housing and is capable of being moved radially towards the center of the housing by a positioning rotor rotatably carried therein. Adjacent to the stator-like housing is a rotor housing carrying a magnetic braking disc having a plurality of bar magnets extending radially from the center thereof. The magnetic braking disk is keyed to one end of a rotatable shaft for axial movement thereon. When the positioning rotor is partially rotated by either manual or automatic means, the magnets within the stator-like housing are radially repositioned such that the magnetic lines of flux will attract the keyed magnetic braking disk and slideably move the rotor along the key and in contact with the external face of the stator-like housing. By reversing the rotational movement of the positioning rotor, the magnetic lines of flux generated by the rod magnets will cause the magnetic braking disk to be repelled and be slideably forced along the keyed shaft away from the magnetic stator and into the rotor housing. Intermediate positioning of the rod magnets produces a partial braking or slipping action corresponding to that realized in conventional clutch devices.

9 Claims, 5 Drawing Figures

MAGNETIC BRAKING AND CLUTCH SYSTEM

BACKGROUND OF THE INVENTION

1. Field

This invention is directed generally to a brake and clutch system and particularly to a system which utilizes magnetic lines of flux in combination with a frictional element to achieve a braking or clutching action.

2. State of the Art

Mechanical braking systems which position a stationary element against an element in motion are well known. The frictional drag created between the coacting elements causes a braking or clutching action. The inventor of this application was granted U.S. Pat. No. 3,579,003, on May 18, 1971 covering a magnetic braking system wherein the braking action was achieved solely by lines of magnetic flux. One of the advantages realized by this invention was that frictional wear was eliminated in order to achieve a braking action. Although this particular system was found to be extremely effective for some braking applications, it was subsequently found that the braking power could be substantially improved by utilizing a combination of magnetic lines of flux and coacting elements to achieve a braking action. It was further found that frictional wear of the braking elements can be substantially reduced by utilizing a combination of frictional and magnetic principles to achieve the braking action. Another advantage of this invention is that the device herein described can be readily adapted for incorporation on rotating spools and thereby automatically sense changes in line tension and respond thereto by activating the braking system which will in turn automatically stop rotation of the line spool.

OBJECTS OF THE INVENTION

It is therefore an object of this invention to provide a device which has utility both as a braking and clutch system. Another object of this invention is to provide a device capable of concomitantly utilizing magnetic lines of flux and coacting elements to provide a braking action on a rotating member. Still another object of this invention is to provide a system which will automatically cause braking of a rotating member whenever a response is transmitted to the braking system. Another object of this invention is to provide a brake and clutch system capable of automatically detecting a reduction in line tension on a rotating line collecting spool and in response thereto create a braking action which will reduce if not terminate spool rotation.

SUMMARY OF THE INVENTION

The brake and clutch system of this invention comprises generally a magnetic braking disk keyed to one end of a rotatable shaft for axial movement thereon, a plurality of moveable magnets positioned adjacent to said magnetic braking disk, a means for positioning said magnets to produce magnetic lines of flux capable of slideably moving said magnetic braking disk along the keyed shaft and into braking contact with the face of a stator-like housing interposed between said magnetic braking disk and said movable magnets.

More specifically, the magnetic brake and clutch system includes a stator-like housing fixed to an opposing support member. A plurality of rod-shaped magnets are moved radially within the stator-like housing by means of a positioning rotor. Adjacent to the stator-like housing, a magnetic braking disk adapted with a plurality of radially positioned bar magnets is keyed to a rotatable shaft for slideable movement thereon. Movement of the positioning rotor will physically move and position the rod magnets within the stator housing such that the magnetic lines of flux will attract the keyed magnetic braking disk and move the rotor axially along the key and into frictional contact with the face of the stator-like housing. When the positioning rotor is manually repositioned to its normal position, the magnetic lines of flux will repel the magnetic braking disk and force it along the key and into the rotor housing. When this occurs, the rotatable shaft and the spool attached thereto become free turning. Intermediate positions of the positioning rotor will modify the degree of magnetic attraction permitting a frictional slipping action which corresponds to that of a pair of rotating clutch plates.

DESCRIPTION OF THE PREFERRED EMBODIMENT

Figure 1:
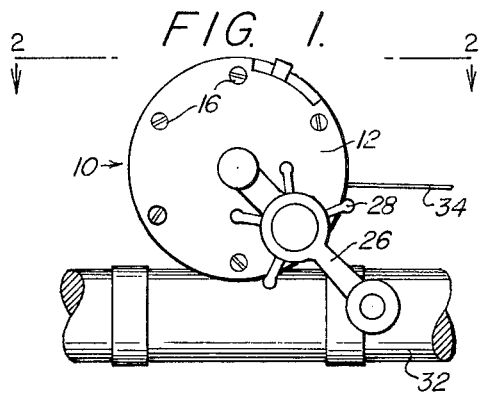
FIG. 1 is a side elevation of the brake and clutch system of this invention incorporated into a line collecting spool.
Figure 2:
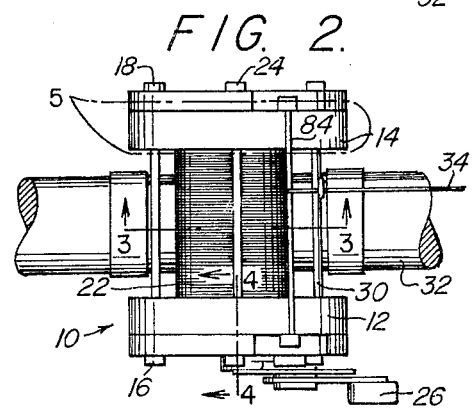
FIG. 2 is a top view of the brake and clutch system and spool taken along line 2—2 of FIG. 1.

As is shown in the accompanying drawings the brake and clutch system of this invention has been incorporated into a fishing reel in which an identical brake and clutch system has been included in each of the reel's side members. Although a fishing reel is depicted in the embodiment shown and described the same principle can be used in other rotating reels or spools such as those used in the electrical and milling industry for collecting wire, thread, yarn and similar types of line material.

Since the brake and clutch system used in the embodiment herein shown are the same for both of the reels side members a reference will be made to only one of the systems which will hereinafter be described in detail.

As shown in the drawings appended hereto, the device of this invention has been incorporated into a fishing reel identified generally by the number 10. The fishing reel shown has a pair of side housing members 12 and 14, respectively, which are supported by a plurality of long stemmed bolts 16 and nuts 18 extending through openings 20 located along the peripheral edge of the member's side wall. A line collecting spool 22 is mounted to a shaft 24 journaled for rotation within each of the side housing members. The shaft is rotated by means of a handle 26 operatively connected to the shaft by means of a series of gears (not shown). A conventional drag system (not shown) is controlled by an adjusting drag wheel 28 mounted to one of the side wall members. The fishing reel shown includes a conventional level wind system controlled by a level wind bar 30 which extends axially along the forward edge of the fishing reel. A conventional means for fastening the reel to a fishing rod 32 is also provided. A fishing line 34 is collected on the spool 22 and extends out therefrom through eyelets mounted to the fishing rod in conventional fashion.

Figure 4:
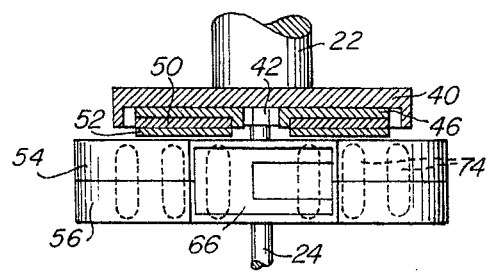
FIG. 4 is an enlarged vertical cross section of the brake and clutch system taken along line 4—4 of FIG. 2.
Figure 5:
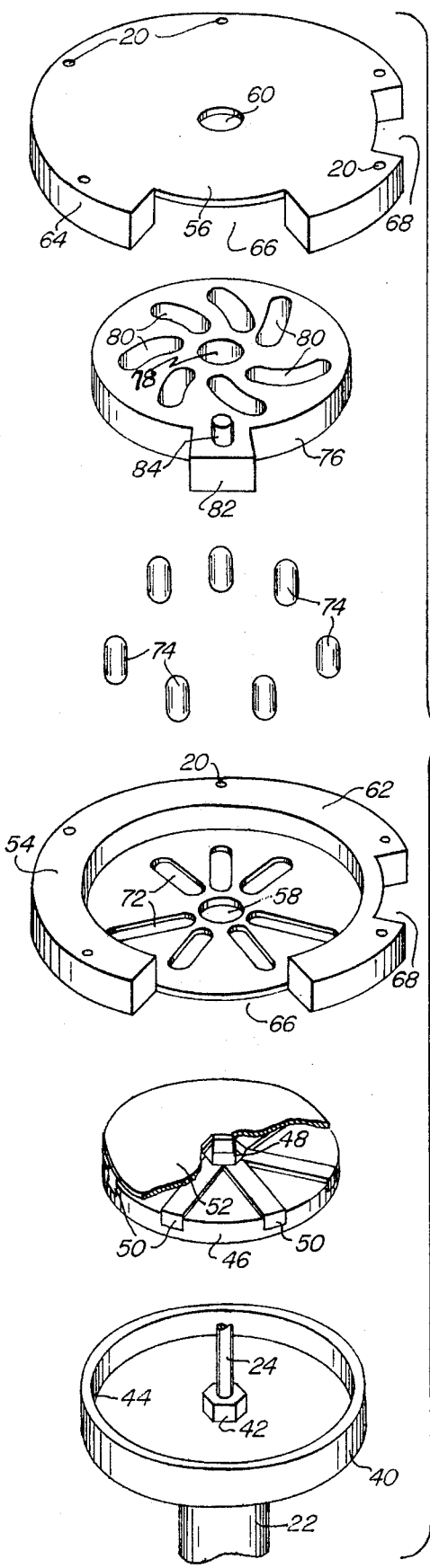
FIG. 5 is an enlarged exploded view of the brake and clutch system incorporated in the system shown in FIG. 2.

As more clearly shown in FIGS. 4 and 5, the reels side members 12 and 14 provide the housing for the brake and clutch system of this invention. As shown, the line collecting spool 22 is fixed to a circular rotor housing member 40 from which a keyed shaft 24 extends outwardly. Keying in this particular instance is accomplished by means of a hexagonal nut 42 fixed to one of the inner ends of the shaft 24. The outer limits of the housing is determined by an annular wall 44 extending outwardly from the face of the rotor housing 40. A circular magnetic braking disk 46 having a cutout center section 48 corresponding in size and shape to the keyed portion of the shaft 24 is carried within the housing. In the embodiment shown the center section is hexagonal, however, other keying means such as splines or grooves may be used. Any keying system which will permit the magnetic braking disk to slideably move along the key may be used. Keying which will cause locking on the shaft or which will hamper a sliding action is for the most part unsatisfactory.

The rotor housing is constructed from a non-magnetic or non-magnetizable material such as aluminum, various types of stainless steel, plastics, resins and the like. The rotor is likewise constructed from a non-magnetic material such as plastic. Eminating radially from the center of the braking disk and embedded therein are a plurality of bar magnets 50 wherein the bar magnets and/or the face of the braking disk are covered by a raised brake lining material 52. The bar magnets are positioned such that like poles (e.g., North Poles) are at or near the center of the braking disk. Conversely all magnetic South Poles are positioned at or near the peripheral edge of the magnetic braking disk. The poles can be reversed if desired as will be subsequently pointed out. The magnetic braking disk is positioned about the key 42 and covered by one end of a two piece stator housing 54 and 56, respectively. The stator housing forms the reels side members hereinbefore referred to. Both pieces of the stator housing are identical in shape and design. Both contain a center opening 58 and 60 through which the shaft 24 passes. Peripheral openings 20 are also provided for receiving long stemmed bolts 16 (not shown in FIG. 5) which pass through and enter other openings carried by the opposing member, which in this case is a second stator housing. The rotatable spool is as previously mentioned, rotatably suspended between the two end members. Each of the two stator housing pieces contain inwardly extending walls 62 and 64, respectively. Two notches 66 and 68 are provided in the walls of each of the two end pieces 54 and 56. Notch 68 provides a viewing means for visibly detecting a color ledge (not shown) which indicates whether the line spool is in a free wheeling condition or whether it is locked in a stationary position.

Grooved radial slots 72 are cut into each of the inner faces of the end housing pieces for receiving the ends of a cylindrical magnet 74. The magnets are held in position and moved within guide slots 72 by means of a partially rotatable positioning rotor 76. The rotor is adapted with a center opening 78 and a plurality of curved cut-out slots 80 extending outwardly from the center of the positioning rotor. Each cut-out slot is adapted to receive a cylindrical magnet which is capable of moving radially by partial rotation of the positioning rotor. The magnets are guided by the grooves formed in each of the stator housings end pieces. The magnets are of sufficient length so that the ends of the magnets are held within the guide slots 72 to permit radial movement of the magnets. A handle 82 extends outwardly from the positioning rotor to which a roll bar 84 is perpendicularly mounted. The roll bar extends axially therefrom and is connected to a second handle extending out from the positioning rotor mounted in the other end piece.

If desired, the positioning rotor can be adapted to ride on a ball bearing race or its equivalent positioned along the inside face of each of the stator's end plates. As earlier indicated, rotational movement of the positioning rotor will force the magnets held within the slots and grooves of the stator's end plates in a radial direction. As also earlier indicated, the rotor is slideably fixed to the rotor shaft so that the rotational movement of the shaft is imparted to the rotor. In the embodiment shown, the attracting magnetic lines of flux created by the various magnets continually urge the positioning rotor to a downward position producing a braking action.

Figure 3:
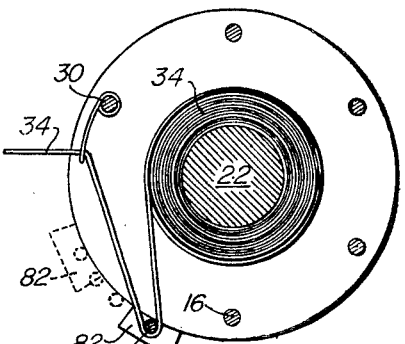
FIG. 3 is an enlarged side cross section of the brake and clutch system and spool taken along line 3—3 of FIG. 2.

However, the tension created by the line extending from the spool continually urges the tension line bar upward (shown in phantom in FIG. 3) and thus maintains the positioning rotor in a magnetic repelling upward position. If for any reason the line tension is lost, as by a break in the line, the positioning rotor will be returned to its normal position by the attracting magnetic lines of flux, which in turn draws the keyed magnetic braking disk against the face of the housing causing a braking action. The devices sensitivity in detecting changes in line tension is controlled by varying the distance between the magnets carried by the rotor and the moveable magnets carried within the stator housing or by varying the size of the magnets used. Each application of the device of this invention will determine the size, position and number of magnets employed. If a particular application requires that the tension bar be continually urged in a downward position as opposed to an upward position as hereinbefore described, the position of the moveable magnets may be inverted and thereby reverse the repelling and attracting magnetic lines of flux.

Since the position of the positioning rotor will directly affect the physical placement of the moveable magnets and thereby affect the intensity of the attracting magnetic lines of flux, direct control of the braking or clutching intensity can be maintained. In other words, the intensity to which the magnetic rotor is drawn and held against the face of the stator housing will determine the degree of braking exerted against the rotating member. To maximize the device's braking action, or for that matter its clutching action, the face of the bar magnets is preferably coated or lined in whole or part with a brake or clutch lining material such as asbestos, metal lining or other similar braking or clutching materials.

While the invention has been described with reference to specific embodiments, it should be understood that certain changes may be made by one skilled in the art and would not thereby depart from the spirit and scope of this invention, which is limited only by the claims appended hereto.

I claim:

1. A brake and clutch device comprising a magnetic braking disk keyed for axial movement to one end of a rotatable keyed shaft, a plurality of moveable means capable of generating magnetic lines of flux, a member having a braking surface interposed between said magnetic braking disk and said moveable means and a means for positioning said moveable means whereby said magnetic lines of flux can be altered such that said magnetic braking disk is caused to move axially along said keyed shaft either toward or away from said braking surface of said member.

2. The device of claim 1 wherein said moveable means are elongated magnets having a north and south pole.

3. The device of claim 2 wherein said magnetic braking disk comprises a non-magnetically attractable disk having a plurality of bar shaped magnets radially affixed thereto.

4. The device of claim 3 wherein said bar shaped magnets of said magnetic braking disk are covered with a brake lining material affixed thereto.

5. The device of claim 1 wherein said member interposed between said magnetic braking disk and said moveable means is a wall of a housing for enclosing said moveable means and means for positioning said moveable means.

6. The device of claim 5 wherein said means for positioning said moveable means is a positioning rotor having a plurality of curved radial slots.

7. The device of claim 6 wherein said moveable means are elongated magnets positionally held by said slots of said positioning rotor.

8. The device of claim 7 wherein said positioning rotor includes a tension bar capable of sensing changes in the tension of a line eminating from a line spool fixed to said rotatable shaft.

9. A method for braking a rotatable spool fixed to a keyed shaft comprising moving a brake lined magnetic braking disk carried on said keyed shaft towards and against a stationary member by positioning a plurality of radially moveable magnets housed within said stationary member such that the resulting magnetic lines of flux will move said brake lined magnetic braking disk toward and against said stationary member.

* * * * *